(12) United States Patent
Kira et al.

(10) Patent No.: US 7,549,940 B2
(45) Date of Patent: Jun. 23, 2009

(54) POWER TRANSMITTING DEVICE FOR VEHICLE

(75) Inventors: Nobuhiro Kira, Wako (JP); Yuichi Nakazato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 450 days.

(21) Appl. No.: 11/527,474

(22) Filed: Sep. 27, 2006

(65) Prior Publication Data

US 2007/0093344 A1   Apr. 26, 2007

(30) Foreign Application Priority Data

Oct. 25, 2005   (JP)   ............................. 2005-309383

(51) Int. Cl.
*F16H 37/08* (2006.01)
(52) U.S. Cl. ..................................... 475/204
(58) Field of Classification Search ............. None
See application file for complete search history.

(56) References Cited

U.S. PATENT DOCUMENTS

| 4,418,777 A | | 12/1983 | Stockton | |
|---|---|---|---|---|
| 5,533,943 A | * | 7/1996 | Ichioka et al. | 475/198 |
| 5,554,080 A | * | 9/1996 | Dangel | 475/204 |
| 5,643,127 A | * | 7/1997 | Yoshii et al. | 475/160 |
| 5,836,848 A | * | 11/1998 | Janiszewski et al. | 475/204 |
| 6,117,038 A | * | 9/2000 | Nishiji et al. | 475/221 |
| 7,351,178 B2 | * | 4/2008 | Keuth | 475/204 |

FOREIGN PATENT DOCUMENTS

JP       2001-121980 A       5/2001

* cited by examiner

*Primary Examiner*—Dirk Wright
(74) *Attorney, Agent, or Firm*—Arent Fox LLP.

(57) ABSTRACT

A power transmitting device for a vehicle for transmitting a driving force from a driving source to right and left axles. The power transmitting device includes a housing, a planetary gear type speed reducing mechanism connected to the driving source, a differential gear unit arranged in coaxial relationship with the planetary gear type speed reducing mechanism and connected to the right and left axles, and an oil reservoir provided in a lower region of the housing. The differential gear unit has a differential case formed integrally with a planetary carrier of the speed reducing mechanism. The planetary carrier includes first and second annular members axially spaced apart from each other and a plurality of connecting portions for connecting the first and second annular members, each of the connecting portions having a substantially V-shaped configuration opening outward in the radial direction of the first and second annular members.

5 Claims, 16 Drawing Sheets

POWER TRANSMITTING DEVICE FOR VEHICLE

BACKGROUND OF THE INVENTION

1. Field of the Invention

The present invention relates to a power transmitting device for a vehicle for transmitting a driving force from a driving source such as an electric motor through a differential gear unit to right and left axles of the vehicle, and more particularly to a power transmitting device for a vehicle in which an electric motor for driving the axles, a planetary gear type speed reducing mechanism, and a differential gear unit are arranged in coaxial relationship with the axles.

2. Description of the Related Art

Proposed in U.S. Pat. No. 441,877 is a power transmitting device for a vehicle having a structure such that right and left axles of the vehicle are connected to a differential gear unit and a driving force from an electric motor coaxially provided on the outer circumference of one of the right and left axles is transmitted through a planetary gear type speed reducing mechanism to the differential gear unit. In this power transmitting device, the electric motor for driving the axles and the planetary gear type speed reducing mechanism for reducing the rotational speed of the electric motor are coaxially provided on the outer circumference of one of the axles, and all of the electric motor, the planetary gear type speed reducing mechanism, and the differential gear unit are accommodated in an integral housing.

The planetary gear type speed reducing mechanism has a sun gear connected to a rotor of the electric motor provided on the outer circumference of one of the axles, a ring gear fixed to the housing, a plurality of planetary gears each meshing with the sun gear and the ring gear, and a planetary carrier for carrying the planetary gears. The planetary carrier is connected to a differential case of the differential gear unit. Accordingly, a driving force from the electric motor is reduced in rotational speed at a set reduction ratio, and then input through the planetary carrier to the differential gear unit. Thereafter, the driving force is output from the differential gear unit to the right and left axles.

In this power transmitting device, both the electric motor and the planetary gear type speed reducing mechanism are coaxially provided on the outer circumference of one of the axles, so that the power transmitting device can be arranged compactly around the axles. Further, disclosed in Japanese Patent Laid-open No. 2001-121980 is a power transmitting device for a forklift having a structure such that an electric motor, a planetary gear type speed reducing mechanism, and a differential gear unit are coaxially provided on the outer circumference of one of the right and left axles and a driving force from the electric motor is transmitted to the right and left axles. A ring rear of the planetary gear type speed reducing mechanism is fixed to a housing, and a planetary carrier of the planetary gear type speed reducing mechanism is formed integrally with a differential case of the differential gear unit.

In these power transmitting devices described above, an oil reservoir intended for lubrication or the like is provided at the bottom of the housing. A dynamic level of oil stored in the oil reservoir is set below a radially outermost position of the rotor of the electric motor, so as to suppress oil agitation resistance by the planetary gear type speed reducing mechanism and/or oil agitation resistance by the rotor of the electric motor.

In the case that each pinion gear (planetary gear) of the planetary gear type speed reducing mechanism is provided by a dual-stage pinion gear or a double pinion gear composed of a large-diameter gear meshing with the sun gear and a small-diameter gear meshing with the ring gear, each large-diameter pinion gear is immersed into the oil stored in the oil reservoir during rotation, so that the oil is splashed up by each large-diameter pinion gear. In this case that each pinion gear is provided by such a dual-stage pinion gear, it is considered that the planetary carrier for carrying the dual-stage pinion gear is composed of a pair of annular members axially spaced apart from each other and a plurality of connecting portions for connecting these annular members in an integral manner.

In this case, each connecting portion is immersed into the oil during rotation of the planetary carrier, so that oil agitation resistance due to the oil splash-up by each connecting portion is generated. As a result, power transmission efficiency in driving and in energy regeneration is reduced to cause a reduction in fuel economy. In the case that each connecting portion is formed as an arcuate member for connecting the outer circumferences of the pair of annular members, the oil splashed up by each large-diameter pinion gear is hindered by each connecting portion during rotation of the planetary carrier, so that the oil cannot drop into the oil reservoir and the amount of oil in the oil reservoir is therefore reduced.

As a result, the oil level in the oil reservoir is lowered and an oil inlet of an oil strainer is therefore exposed to the atmosphere in turning, sudden starting, uphill running, or downhill running of the vehicle, causing the occurrence of aeration such that the air is mixed into the oil. The occurrence of such aeration causes a reduction in thrust force of a clutch in a hydraulic control system, resulting in difficulty of clutch control. Further, in the case that each connecting portion of the planetary carrier has an arcuate shape, torsional rigidity against a gear reaction can be easily ensured, but it is disadvantageous in bending rigidity in the radial direction. Accordingly, the wall thickness of each connecting portion must be increased in order to ensure a sufficient bending rigidity in the radial direction, causing an increase in weight of the planetary carrier.

In the prior art disclosed in the patent documents mentioned above, the ring gear of the planetary gear type speed reducing mechanism is fixed, so that the rotor of the electric motor is connected through the planetary gear type speed reducing mechanism to the differential gear unit so as to always provide a fixed speed reduction ratio. As a result, the rotor of the electric motor is always rotated according to the rotation of the axles during running of the vehicle. There is a case that the rotor of the electric motor may be forcibly rotated at high speeds according to the circumstances, causing an increase in loss in the electric motor and the production of undesired friction on the axles.

SUMMARY OF THE INVENTION

It is therefore an object of the present invention to provide a power transmitting device for a vehicle which can suppress a reduction in oil level in an oil reservoir due to the splash-up of oil by a pinion gear, thereby preventing the occurrence of aeration during turning of the vehicle, for example.

It is another object of the present invention to provide a power transmitting device for a vehicle having a planetary carrier with a plurality of connecting portions wherein each connecting portion is improved in shape to ensure both torsional rigidity and bending rigidity with a minimum weight.

In accordance with an aspect of the present invention, there is provided a power transmitting device for a vehicle for transmitting a driving force from a driving source to right and left axles, including a housing; a planetary gear type speed reducing mechanism connected to the driving source; a differential gear unit arranged in coaxial relationship with the planetary gear type speed reducing mechanism and connected to the right and left axles; and an oil reservoir provided in a lower region of the housing; the planetary gear type speed reducing mechanism including a sun gear connected to the driving source, a dual-stage pinion gear composed of a first gear meshing with the sun gear and a second gear formed integrally with the first gear in axially adjacent relationship with the first gear, the first gear having a diameter larger than that of the second gear, a planetary carrier for carrying the dual-stage pinion gear, and a ring gear meshing with the second gear of the dual-stage pinion gear; the differential gear unit including a differential case formed integrally with the planetary carrier; the planetary carrier including first and second annular members axially spaced apart from each other and a plurality of connecting portions for connecting the first and second annular members, each of the connecting portions having a substantially V-shaped configuration opening outward in the radial direction of the first and second annular members.

With this arrangement, the first and second annular members of the planetary carrier are connected by the plural connecting portions each having a substantially V-shaped configuration opening outward in the radial direction of the first and second annular members. Accordingly, it is possible to prevent that the oil splashed up by the pinion gear may stay in the planetary carrier, thereby suppressing a reduction in oil level in the oil reservoir. As a result, it is possible to prevent the occurrence of aeration during turning of the vehicle, for example, which aeration may easily occur in the case that the oil level is lowered.

Preferably, the clearance between each V-shaped connecting portion and the outer circumference of the first gear of the dual-stage pinion gear is minimized. Accordingly, it is possible to prevent that the oil splashed up by the first gear may stay in the clearance between each connecting portion and the first gear, thereby suppressing a reduction in oil level in the oil reservoir.

Preferably, the radially outermost position of each V-shaped connecting portion is set above a dynamic oil level in the oil reservoir. Accordingly, the generation of oil agitation resistance by each connecting portion can be prevented.

Preferably, the power transmitting device further includes a braking mechanism provided between the ring gear and the housing for engaging the ring gear and the housing to apply a braking force to the ring gear.

With this arrangement, the operational condition of the ring gear can be switched between fixation and free rotation by the braking mechanism interposed between the ring gear and the housing, thereby allowing the control of transmission, such as connection or disconnection, of the driving force between an electric motor as an example of the driving source and the axles. Accordingly, excessive rotation of the electric motor can be prevented and friction on the axles can be reduced with a compact structure of the device being maintained.

Preferably, the driving source includes an electric motor; the power transmitting device further comprises a cylindrical shaft connected to a rotor of the electric motor and the sun gear of the planetary gear type speed reducing mechanism; and one of the right and left axles is coaxially inserted in the cylindrical shaft. With this arrangement, the power transmitting device can be made compact.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
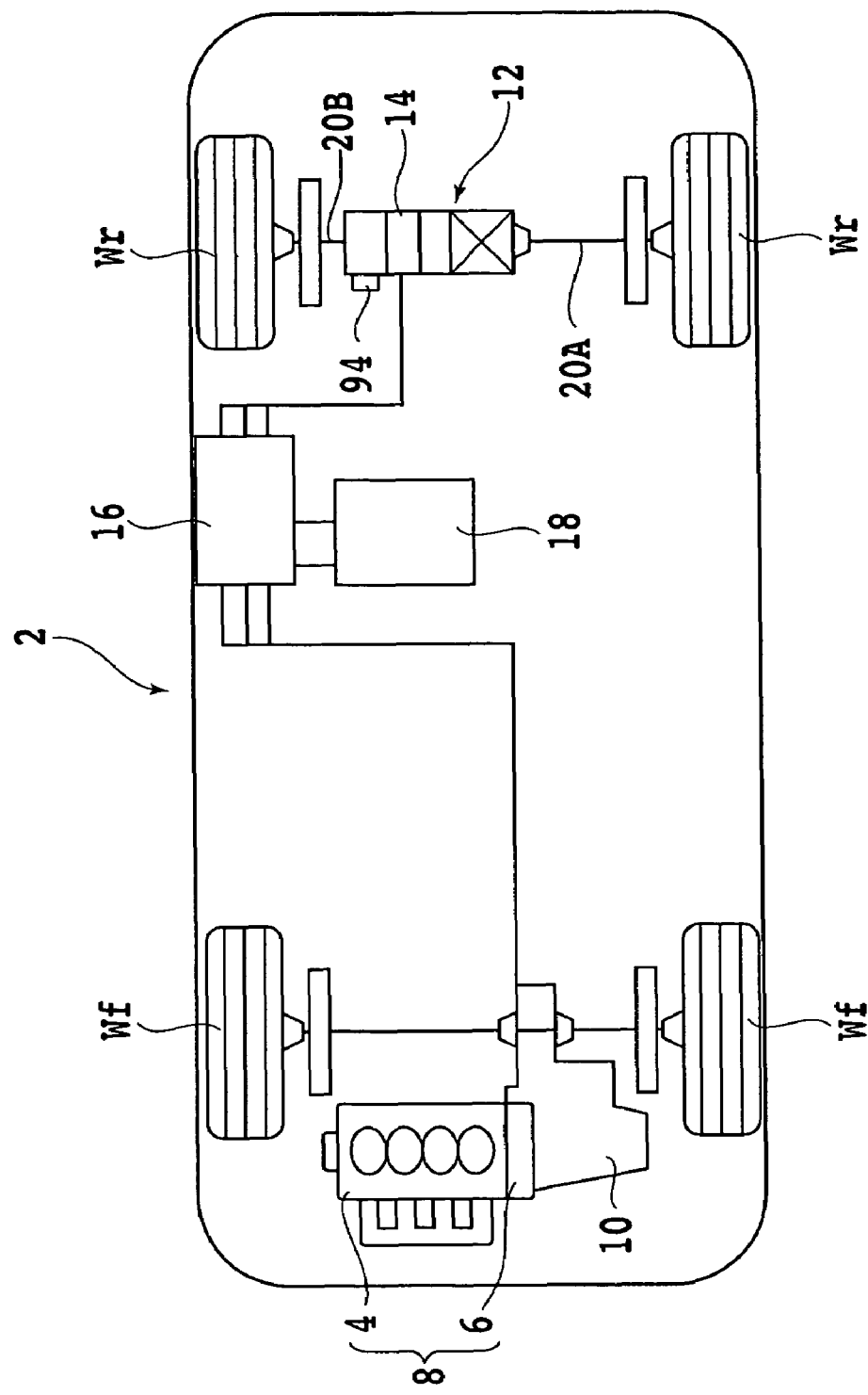
FIG. 1 is a schematic plan view showing a driving system in a vehicle to which the power transmitting device of the present invention is applicable.

Referring first to FIG. 1, there is shown a driving mechanism in a vehicle to which the power transmitting device of the present invention is suitably applied. The vehicle 2 is a hybrid vehicle having a drive unit 8 configured by connecting an internal combustion engine 4 and an electric motor 6 in series. Power from the drive unit 8 is transmitted through a transmission 10 to front wheels Wf. On the other hand, a power transmitting device 12 according to the present invention is provided independently of the drive unit 8, and power from the power transmitting device 12 is transmitted to rear wheels Wr. The power transmitting device 12 includes an electric motor 14 for driving the rear wheels Wr. The electric motor 6 of the drive unit 8 and the electric motor 14 of the power transmitting device 12 are connected through a power drive unit (PDU) 16 to a battery 18. The supply of electric power from the battery 18 to the electric motors 6 and 14 and the regeneration of energy from the electric motors 6 and 14 to the battery 18 are performed through the PDU 16.

Figure 2:
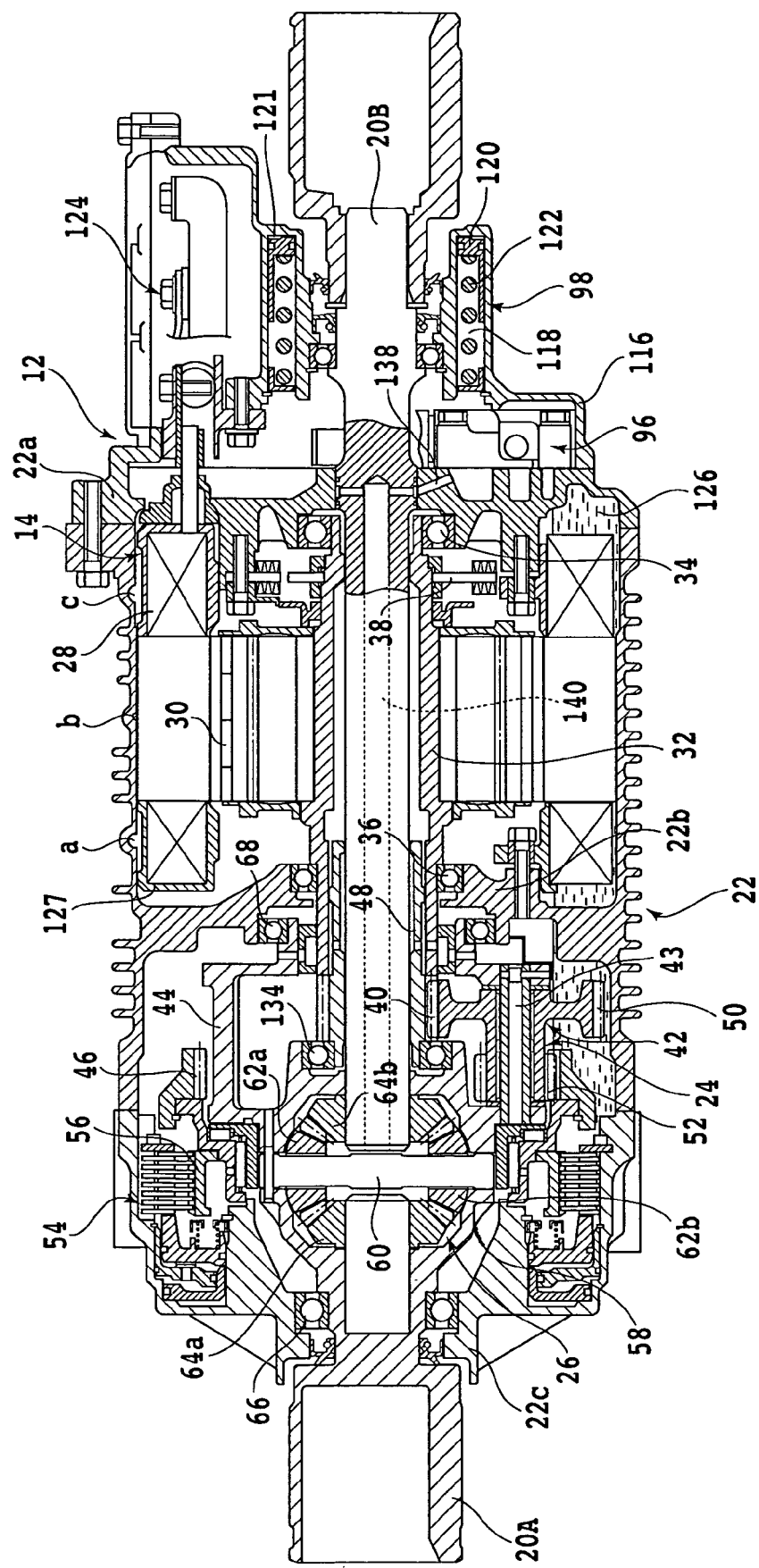
FIG. 2 is a vertical sectional view of the power transmitting device shown in FIG. 1.

Referring to FIG. 2, there is shown a vertical sectional view of the power transmitting device 12. In FIG. 2, reference numerals 20A and 20B denote left and right axles of the rear wheels Wr, respectively. The power transmitting device 12 has a housing 22 provided so as to surround the outer circumference of the right rear axle 20B. The housing 22 and the right rear axle 20B are supported to a rear lower portion of the vehicle 2. The housing 22 has a substantially cylindrical shape as a whole, and contains the electric motor 14 for driving the rear axles 20A and 20B, a planetary gear type speed reducing mechanism 24 for reducing the rotational speed of the electric motor 14, and a differential gear unit 26 for distributing the output from the planetary gear type speed reducing mechanism 24 to the rear axles 20A and 20B. The electric motor 14, the speed reducing mechanism 24, and the differential gear unit 26 are arranged in coaxial relationship with the rear axles 20A and 20B.

The electric motor 14 has a stator 28 fixed to the inner circumference of the housing 22 at a right portion thereof and an annular rotor 30 rotatably provided inside of the inner circumference of the stator 28. The electric motor 14 is a DC brushless motor or a permanent magnet type AC synchronous motor. A cylindrical shaft 32 for surrounding the outer circumference of the axle 20B is joined to the inner circumference of the rotor 30. The cylindrical shaft 32 is supported through bearings 34 and 36 to a right end wall 22a and an intermediate wall 22b of the housing 22 in coaxial relationship with the axle 20B. A resolver 38 for feeding information on a rotational position of the rotor 30 back to a controller (not shown) for the electric motor 14 is provided between the outer circumference of the cylindrical shaft 32 at a right end portion thereof and the right end wall 22a of the housing 22.

The planetary gear type speed reducing mechanism 24 includes a sun gear 40, a plurality of dual-stage pinion gears (dual-stage planetary gears) 42 meshing with the sun gear 40, a planetary carrier 44 for supporting these dual-stage pinion gears 42, and a ring gear 46 meshing with the dual-stage pinion gears 42 along the outer circumferences thereof. A driving force output from the electric motor 14 is input to the sun gear 40, and is then output through the planetary carrier 44 with the rotational speed of the rotor 30 being reduced by the speed reducing mechanism 24. The sun gear 40 is formed integrally with the outer circumference of a sleeve 48 coaxially provided on the outer circumference of the axle 20B. The sleeve 48 is splined at one end portion thereof to the cylindrical shaft 32 joined to the rotor 30 of the electric motor 14, so that the sleeve 48 is rotatable with the cylindrical shaft 32.

Each dual-stage pinion gear 42 has a first gear 50 directly meshing with the sun gear 40 and a second gear 52 having a diameter smaller than that of the first gear 50. The first and second gears 50 and 52 are formed integrally with each other in such a manner as to be coaxial with each other and axially offset from each other. Each dual-stage pinion gear 42 is rotatably supported through a shaft 43 to the planetary carrier 44. The reason for use of the dual-stage pinion gears 42 as the pinion gears in the planetary gear type speed reducing mechanism 24 is to attain a large reduction ratio. In this preferred embodiment, the rotational speed of the rotor 30 of the electric motor 14 can be reduced to about ⅕.

The ring gear 46 is rotatably provided in the housing 22 at a position on the axially left side of the first gears 50. The inner circumference of the ring gear 46 is in mesh with the second gears 52. In this preferred embodiment, the maximum radius of the ring gear 46 is set smaller than the maximum distance from the center of the axle 20B to each first gear 50. The ring gear 46 is held by a rotating drum 56 of a hydraulic clutch 54 to be hereinafter described in such a manner as to be rotatable with the rotating drum 56. Thus, the ring gear 46 is rotatably supported through the rotating drum 56 in the housing 22.

The differential gear unit 26 has a differential case 58 formed integrally with the planetary carrier 44 of the speed reducing mechanism 24. A pinion shaft 60 is fixed to the differential case 58, and a pair of pinion gears 62a and 62b are rotatably supported to the pinion shaft 60. A pair of side gears 64a and 64b meshing with the pinion gears 62a and 62b are splined to the left axle 20A and the right axle 20B, respectively.

While the planetary carrier 44 is integral with the differential case 58 in this preferred embodiment, these members 44 and 58 may be formed as separate members, which may be joined together by bolts or the like. The planetary carrier 44 integral with the differential case 58 is rotatably supported to a left end wall 22c of the housing 22 and the intermediate wall 22b of the housing 22 through bearings 66 and 68.

Figure 3:
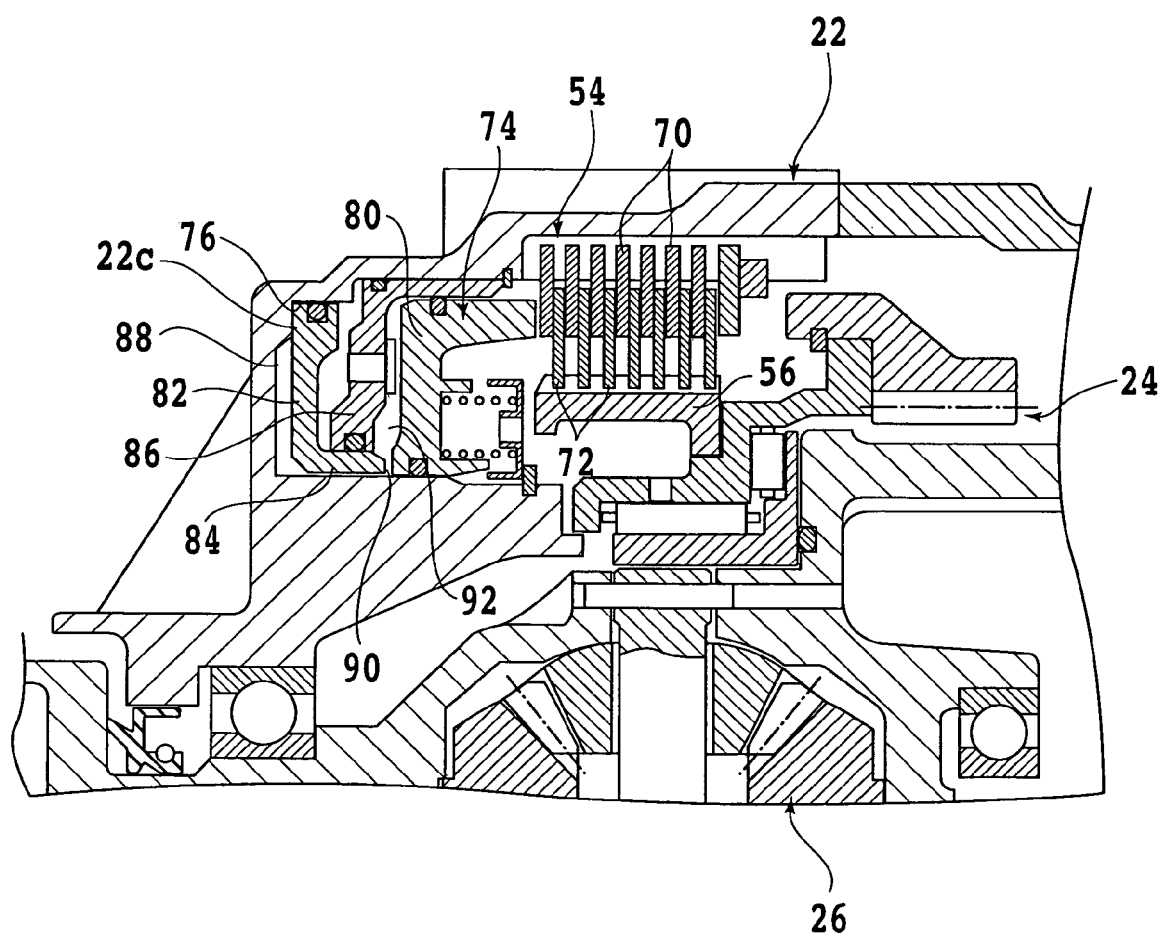
FIG. 3 is an enlarged sectional view of a part of the power transmitting device shown in FIG. 2.

A cylindrical space is defined between the ring gear 46 in the housing 22 and the left end wall 22c of the housing 22, and the hydraulic clutch 54 constituting a braking mechanism for the ring gear 46 is located in this cylindrical space. As best shown in FIG. 3, the hydraulic clutch 54 includes a plurality of fixed plates 70 splined to the inner circumferential surface of the housing 22 and a plurality of rotating plates 72 splined to the outer circumferential surface of the rotating drum 56. These fixed plates 70 and rotating plates 72 are alternately arranged in the axial direction of the rotating drum 56 so as to be brought into pressure contact with each other and separation from each other by the axial movement of an annular piston 74.

The piston 74 is accommodated in an annular cylinder chamber 76 formed inside the left end wall 22c of the housing 22 so as to be axially movable toward and away from the hydraulic clutch 54. When pressurized oil is introduced into the cylinder chamber 76, the piston 74 is moved toward the hydraulic clutch 54, whereas when the oil is discharged from the cylinder chamber 76, the piston 74 is moved away from the hydraulic clutch 54. The hydraulic clutch 54 is connected to a hydraulic circuit 78 shown in FIG. 4, which will be hereinafter described in detail. More specifically, the piston 74 has a first piston wall 80 and a second piston wall 82 axially arranged in tandem. The first and second piston walls 80 and 82 are connected integrally by a cylindrical inner circumferential wall 84.

Accordingly, an annular space opening radially outward is defined between the first piston wall 80 and the second piston wall 82. This annular space is axially partitioned by a partitioning member 86 fixed to the inner circumferential surface of the cylindrical wall of the cylinder chamber 76. The space between the left end wall 22c of the housing 22 and the second piston wall 82 is formed as a first operation chamber 88 into which the pressurized oil is directly introduced, and the space between the partitioning member 86 and the first piston wall 80 is formed as a second operation chamber 92 communicating with the first operation chamber 88 through a hole 90 formed through the inner circumferential wall 84. The space between the second piston wall 82 and the partitioning member 86 communicates with the atmosphere.

Thus, the pressurized oil is introduced into the first operation chamber 88 and the second piston chamber 92, so that the fixed plates 80 and the rotating plates 82 are brought into pressure contact with each other by the oil pressure applied to the first piston wall 80 and the second piston wall 82. Accordingly, a large pressure receiving area can be obtained by the first and second piston walls 80 and 82 axially arranged in tandem, so that a large contact pressure can be applied to the fixed plates 70 and the rotating plates 72 with the radial size of the piston 74 being suppressed.

In the hydraulic clutch 54, the fixed plates 70 are splined to the housing 22, so that the rotation of the fixed plates 22 is inhibited. On the other hand, the rotating plates 72 are splined to the rotating drum 56 and accordingly support the ring gear 46 through the rotating drum 56. Accordingly, when both the plates 70 and 72 are brought into pressure contact with each other by the piston 74, a braking force is applied to the ring gear 46 by the frictional contact of the plates 70 and 72, thereby braking the rotation of the ring gear 46. In contrast, when the piston 74 is retracted to cancel the frictional contact of the plates 70 and 72, free rotation of the ring gear 46 is allowed.

As schematically shown in FIG. 1, a motor-driven oil pump 94 is mounted on the front side of the housing 22. As shown in FIG. 2, a circuit unit 96 constituting a part of the hydraulic circuit 78 shown in FIG. 4 and an accumulator 98 for storing the oil to be supplied to the hydraulic clutch 54 in an accumulated condition are provided on the outside of the right end wall 22a of the housing 22. The circuit unit 96 and the accumulator 98 are accommodated in the form of an integral block inside a cover 116, and this integral block and the cover 116 are fixed together to the right end wall 22a. A feeder section 124 for feeding electric power to the electric motor 14 is provided on the radially outside of the accumulator 98.

The accumulator 98 has a volumetric chamber 118 formed by the cover 116 so as to axially extend along the axle 20B. An annular piston 120 is axially movably accommodated in the volumetric chamber 118. The piston 120 is biased by a spring 122 for accumulation. A piston chamber 121 is defined on the right side of the piston 120, and a high-pressure oil from the motor-driven oil pump 94 is introduced into the piston chamber 121. As a result, the piston 120 is moved leftward against a biasing force of the spring 122, and comes into stop at a position where the biasing force of the spring 122 balances with the oil pressure in the piston chamber 121. When the oil pressure in the piston chamber 121 decreases, the piston 120 is moved rightward by the biasing force of the spring 122. The accumulator 98 is provided to stabilize the oil pressure in operating the hydraulic clutch 54.

Figure 4:
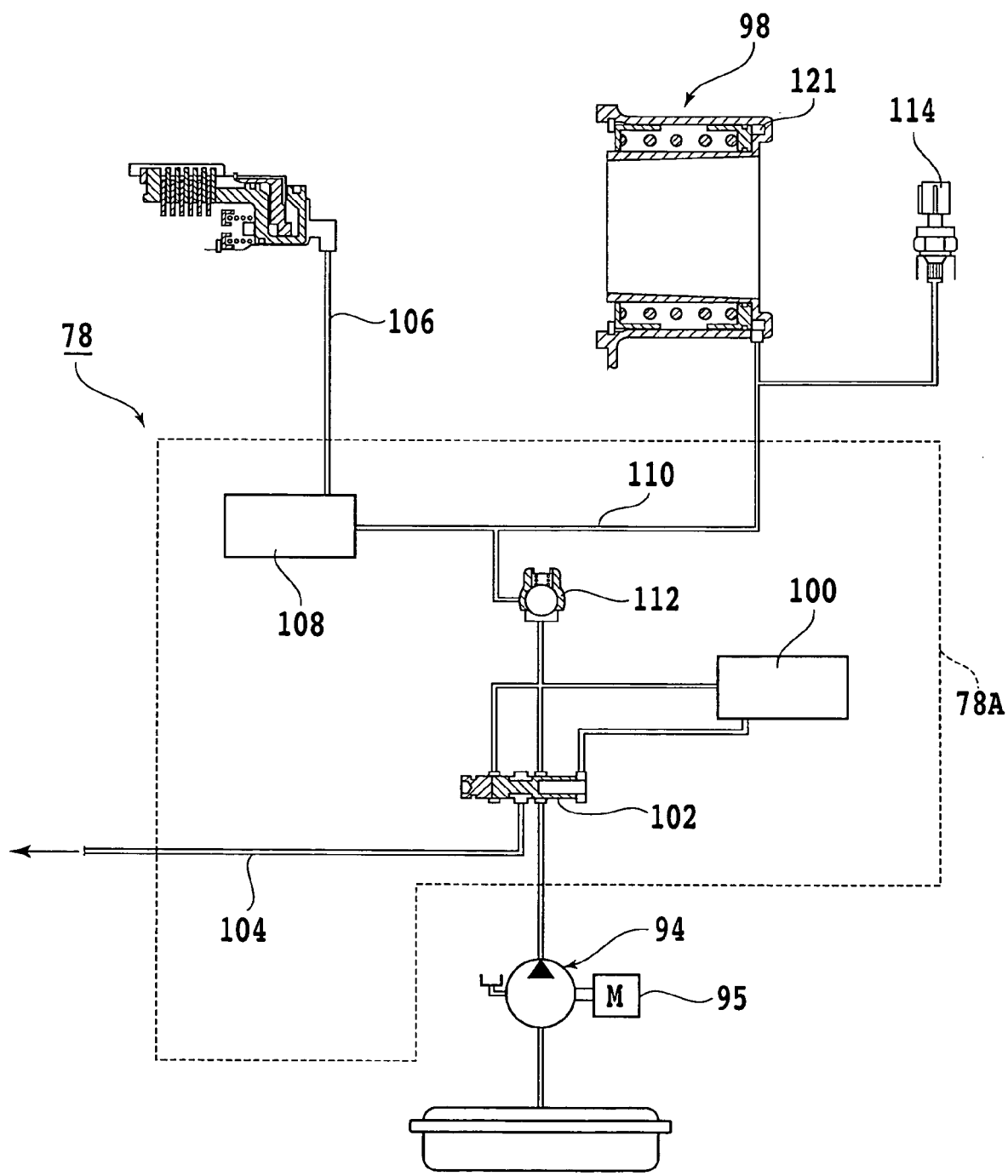
FIG. 4 is a circuit diagram of a hydraulic control system in the power transmitting device.

The hydraulic circuit 78 for the power transmitting device will now be described with reference to FIG. 4. The oil pump 94 as an oil pressure supply is driven by a motor 95 to perform the supply of pressurized oil. The oil from the oil pump 94 is supplied to a selector valve 102 for pressure regulation. When the supplied oil pressure is greater than a set value, the selector valve 102 operates to supply the oil to an oil passage 104 for lubrication and motor cooling, whereas when the supplied oil pressure is less than or equal to the set value, the selector valve 102 operates to supply the oil through a check valve 112 for allowing the oil pass in only one direction to an oil passage 110. An electromagnetic valve 100 is connected to the selector valve 102 to allow the selection between a high pressure intended for accumulation of the oil pressure in the accumulator 98 and a low pressure intended for lubrication and motor cooling. Further, an electromagnetic valve 108 is connected to the oil passage 110 to allow the selection between engagement and disengagement of the hydraulic clutch 54.

The principle of operation of the hydraulic circuit 78 will now be described. The oil pressure in the accumulator 98 intended for pressure accumulation is always monitored by an oil pressure sensor 114. When the oil pressure in the accumulator 98 becomes less than a set value determined by a clutch torque capacity, an ECU supplies an excitation command to the electromagnetic valve 100 according to data from the oil pressure sensor 114, thereby supplying the oil pressure to the side of a spring provided in the selector valve 102. As a result, a high oil pressure is selected by the selector valve 102 and is then supplied through the check valve 112 to the piston chamber 121 of the accumulator 98, thereby leftward moving the piston 120. In this case, it is necessary to preliminarily set the oil pump 94 to a high-load operating condition to be attained in a relatively short period of time.

When the oil pressure in the accumulator 98 becomes the set value or more, the excitation current to the electromagnetic valve 100 is stopped to select a low oil pressure in the selector valve 102, thereby supplying the oil to the oil passage 104 for lubrication and motor cooling. At this time, the oil in the oil passage 110 is not allowed to be returned to the selector valve 102 by the provision of the check valve 112, so that the oil pressure in the oil passage 110 is kept at a high pressure. However, there occurs slight oil leakage from the electromagnetic valve 108, the check valve 112, and oil passages (e.g., separate plate) constituting the hydraulic circuit. Such an oil leakage is canceled by rightward moving the piston 120 in the accumulator 98, so that the oil pressure corresponding to the clutch torque capacity can be maintained for a relatively long period of time. Accordingly, the oil pump 94 can be kept in a low-load operating condition for a relatively long period of time. In this low-load operating condition, the oil is supplied to the oil passage 104 for lubrication and motor cooling. In this preferred embodiment, a main part 78A of the hydraulic circuit 78 is formed as the integral circuit unit 96 on the outside of the right end wall 22a of the housing 22. Accordingly, the power transmitting device 12 can be made compact as a whole as compared with the case of adding a dedicated member for providing such a hydraulic circuit.

An oil reservoir 126 is provided in the housing 22 so as to connect lower regions of the electric motor 14, the speed reducing mechanism 24, and the differential gear unit 26. In this preferred embodiment, the inside space of the housing 22 is axially divided into two spaces by the intermediate wall 22b. The intermediate wall 22b is formed with a through hole (not shown) for allowing free pass of oil and air between these two spaces.

Accordingly, almost all of the bottom portion of the housing 22 having a substantially circular cross section functions as the oil reservoir 126, so that a sufficient amount of oil can be reserved in the housing 22 without especially providing an oil pan. As shown in FIG. 2, a plurality of lubricating oil supplying portions a, b, and c are provided inside of the housing 22 at a portion above the electric motor 14, and a cover 127 having a plurality of oil dropping holes (not shown) is provided on an upper portion of the stator 28 of the electric motor 14. Accordingly, the lubricating oil can be dropped uniformly through these oil dropping holes onto the stator 28 without gathering at a certain position, thereby effectively cooling the stator 28.

Figure 5:
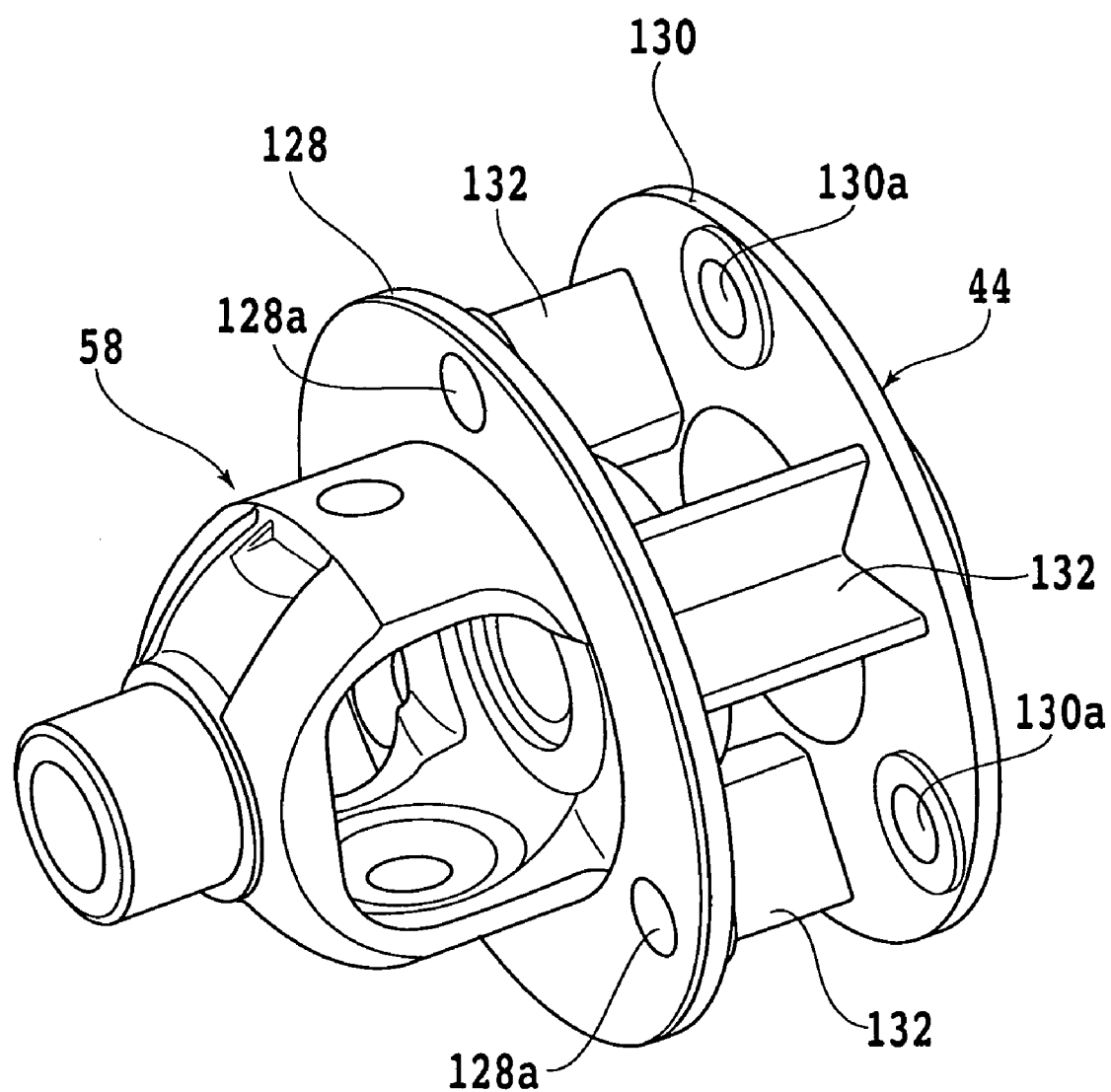
FIG. 5 is a perspective view of a planetary carrier according to a first preferred embodiment of the present invention.
Figure 6:
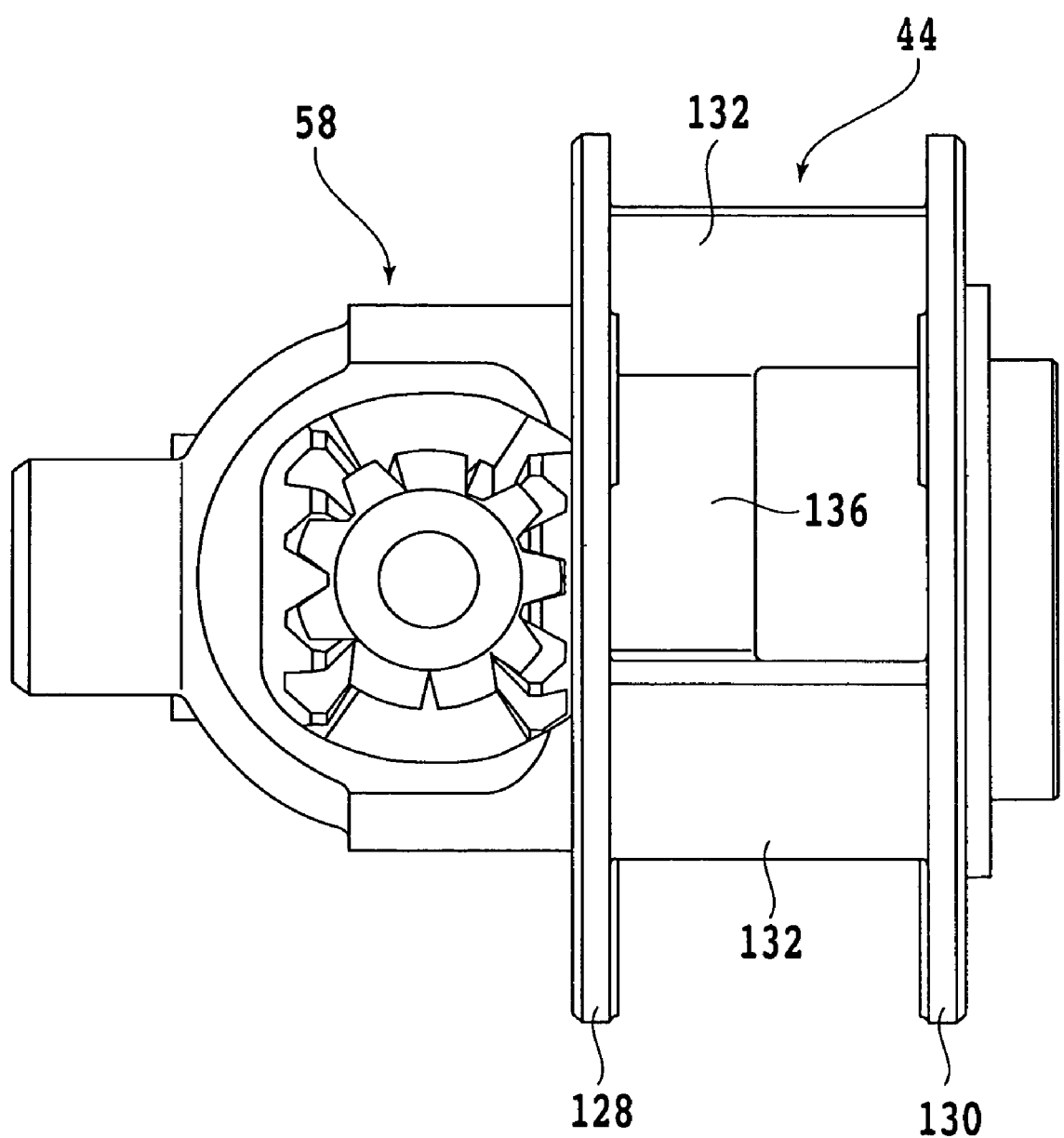
FIG. 6 is an elevational view of the planetary carrier shown in FIG. 5.

Referring to FIG. 5, there is shown a perspective view of the planetary carrier 44 integral with the differential case 58. FIG. 6 is an elevational view of the planetary carrier 44 shown in FIG. 5. The planetary carrier 44 is composed of a pair of annular members 128 and 130 axially spaced apart from each other and a plurality of (e.g., three in this preferred embodiment) connecting portions 132 for connecting the annular members 128 and 130. The connecting portions 132 are equally spaced apart from each other in the circumferential direction of the annular members 128 and 130. Each connecting portion 132 has a substantially V-shaped configuration (cross section) opening outward in the radial direction of the annular members 128 and 130.

Figure 9:
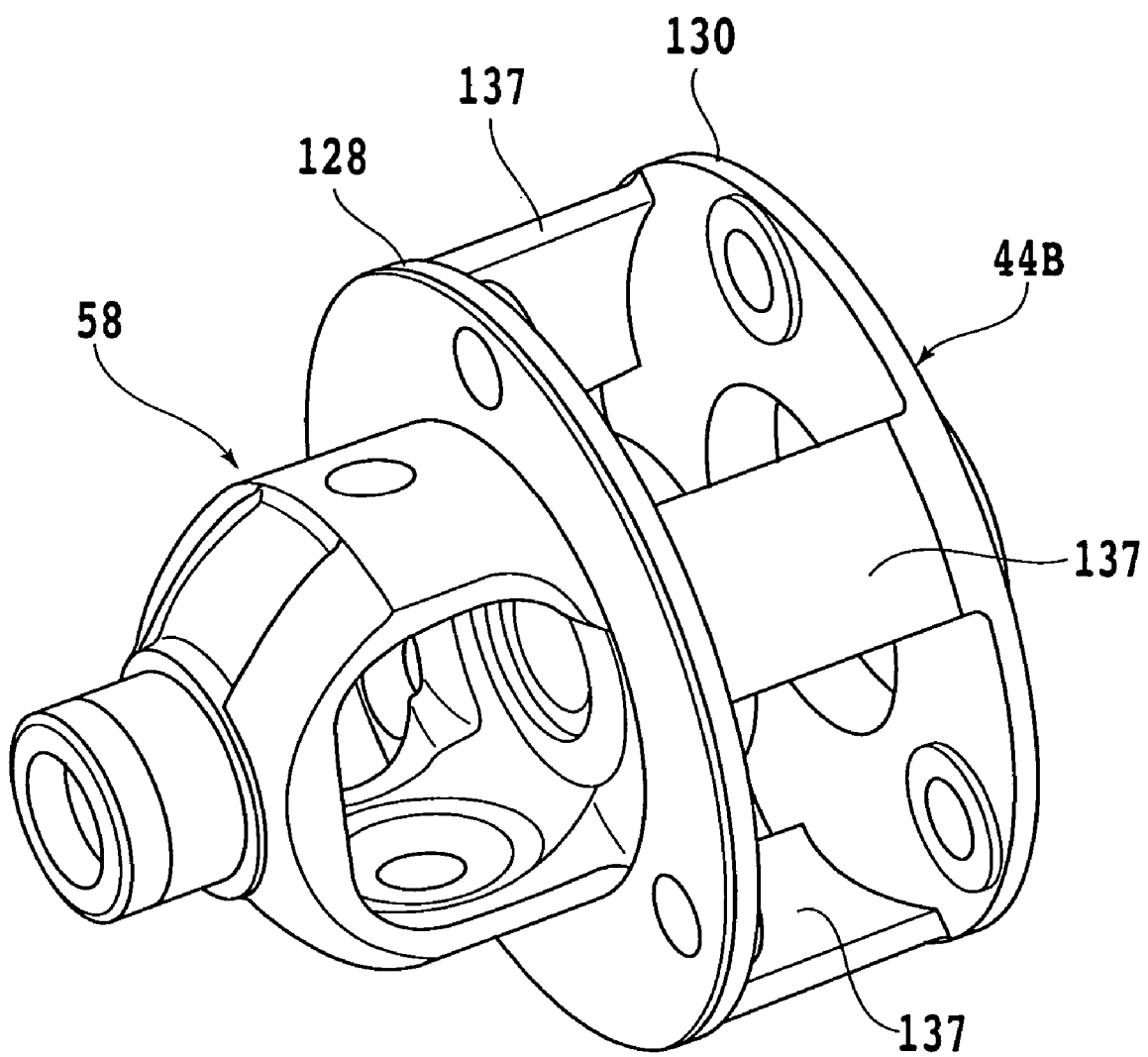
FIG. 9 is a perspective view of a planetary carrier as a comparison.
Figure 10:
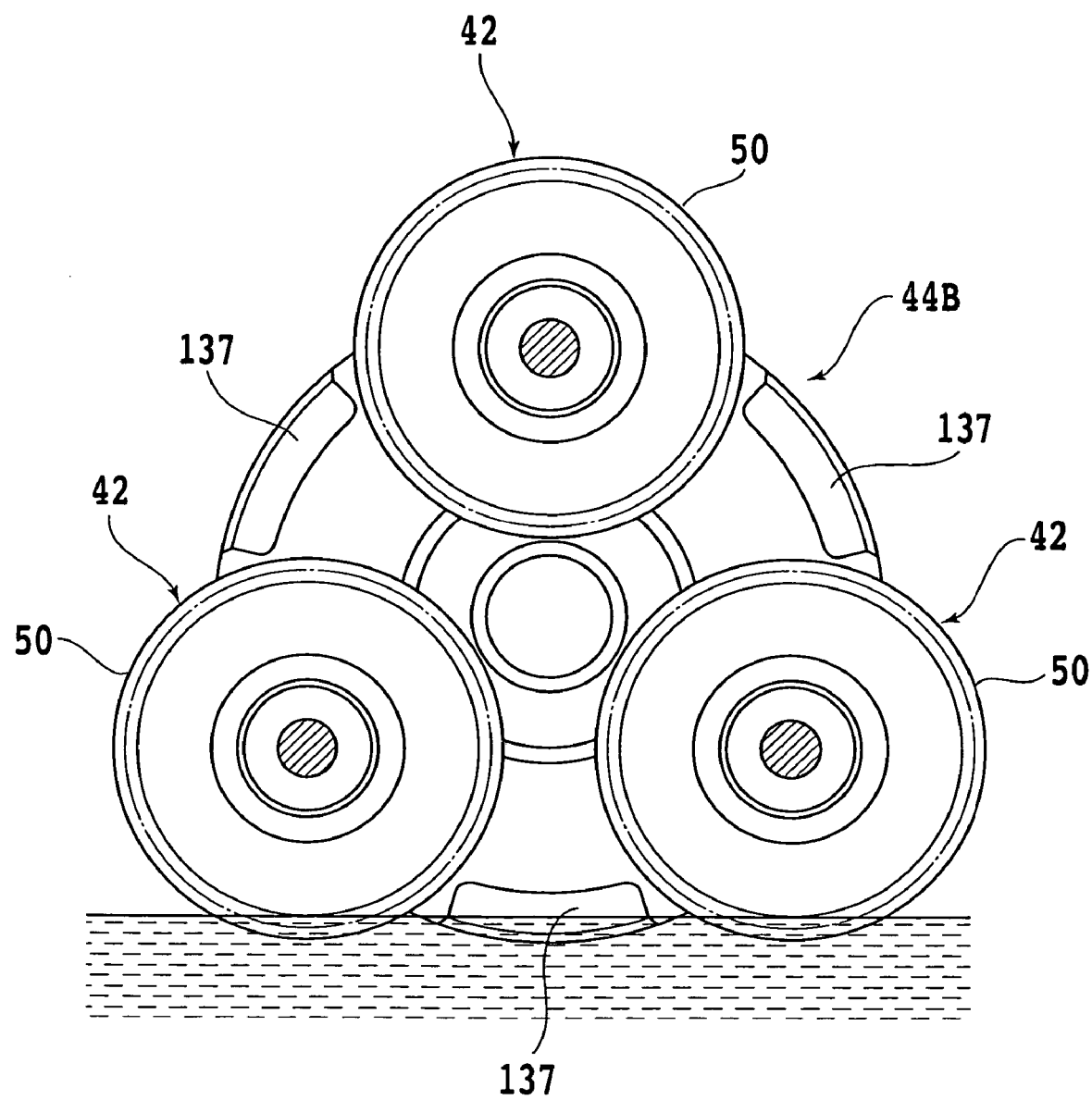
FIG. 10 is a view for illustrating the operation of the comparison shown in FIG. 9.

Thus, the planetary carrier 44 according to this preferred embodiment is characterized in that each connecting portion 132 has such a substantially V-shaped configuration. The reason for use of such V-shaped connecting portions 132 will now be described with reference to FIGS. 9 and 10 showing a comparison. FIG. 9 is a perspective view of a planetary carrier 44B integral with a differential case 58 as a comparison. In the planetary carrier 44B, a pair of annular members 128 and 130 are connected by three arcuate connecting portions 137 equally spaced apart from each other in the circumferential direction of the annular members 128 and 130.

As shown in FIG. 10, the large-diameter first gears 50 of the dual-stage pinion gears 42 and the arcuate connecting portions 137 of the planetary carrier 44B are immersed into the oil stored in the oil reservoir 126 during rotation of the planetary carrier 44B. Accordingly, agitation resistance by the connecting portions 137 is also generated in addition to agitation resistance by the first gears 50. Because of this agitation resistance, the power transmission efficiency in driving and in energy regeneration is reduced to cause a reduction in fuel economy.

Further, when the planetary carrier 44B is rotated, the oil stored in the oil reservoir 126 is splashed up by the first gears 50. This splashed oil is partially received by the arcuate connecting portions 137 concave inward in the radial direction of the annular members 128 and 130, so that the oil cannot be dropped from the planetary carrier 44B into the oil reservoir 126. As a result, the oil level in the oil reservoir 126 is lowered and an oil inlet of an oil strainer is therefore exposed to the atmosphere in turning, sudden starting, uphill running, or downhill running of the vehicle, causing easy occurrence of aeration such that the air is mixed into the oil. The occurrence of such aeration causes a reduction in thrust force of the hydraulic clutch 54, so that the clutch disks of the hydraulic clutch 54 may slip to result in difficulty of clutch control.

Each arcuate connecting portion 137 has a sufficient rigidity against a gear reaction in the torsional direction, but does not have a sufficient rigidity against a bending force in the radial direction. Accordingly, the wall thickness of each arcuate connecting portion 137 must be made sufficiently large in order to ensure a sufficient rigidity against a bending force in the radial direction and thereby to reduce a gear noise. However, the whole weight of the planetary carrier 44B is increased to become impractical.

Figure 7:
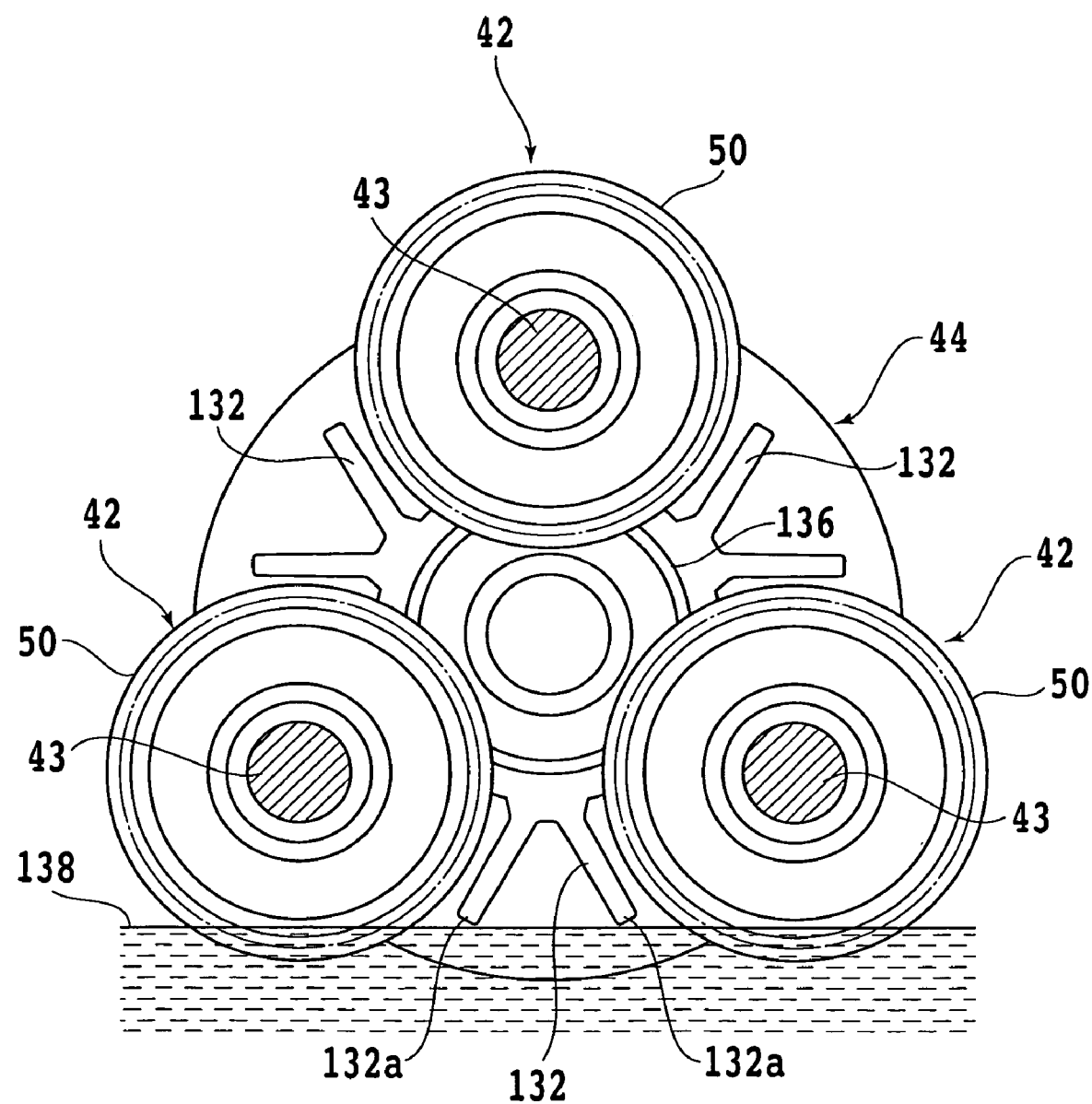
FIG. 7 is a schematic sectional view for illustrating the operation of the planetary carrier shown in FIG. 5.

The planetary carrier 44 according to the first preferred embodiment shown in FIGS. 5 to 7 is intended to solve the above problem, and is characterized in that each connecting portion 132 for connecting the first and second annular members 128 and 130 of the planetary carrier 44 has a substantially V-shaped configuration opening outward in the radial direction of the annular members 128 and 130. As shown in FIG. 5, the first annular member 128 has a plurality of through holes 128a, and the second annular member 130 has a plurality of through holes 130a respectively aligned to the through holes 128a. As shown in FIG. 7, each shaft 43 for rotatably supporting the corresponding dual-stage pinion gear 42 is fixedly inserted in the respective aligned through holes 128a and 130a. With the substantially V-shaped configuration of each connecting portion 132 opening radially outward as mentioned above, it is possible to ensure a sufficient rigidity against a gear reaction in the torsional direction and a sufficient rigidity against a bending force in the radial direction without the need for considerably increasing the wall thickness of each connecting portion 132.

As apparent from FIG. 7, each V-shaped connecting portion 132 is integral with a boss 136 with which the outer race of a bearing 134 (see FIG. 2) is engaged. Further, the clearance between each V-shaped connecting portion 132 and the first gear 50 of each dual-stage pinion gear 42 adjacent thereto is set to a minimum value of 2 to 3 mm, for example. The reason for minimizing the clearance between each V-shaped connecting portion 132 and each first gear 50 adjacent thereto is to suppress the amount of oil splashed up by each first gear 50 and staying in this clearance. Further, the radially outermost position of each V-shaped connecting portion 132 is set above a dynamic oil level 138 in the oil reservoir 126 in order to eliminate agitation resistance by the connecting portions 132 during rotation of the planetary carrier 44.

Figure 8:
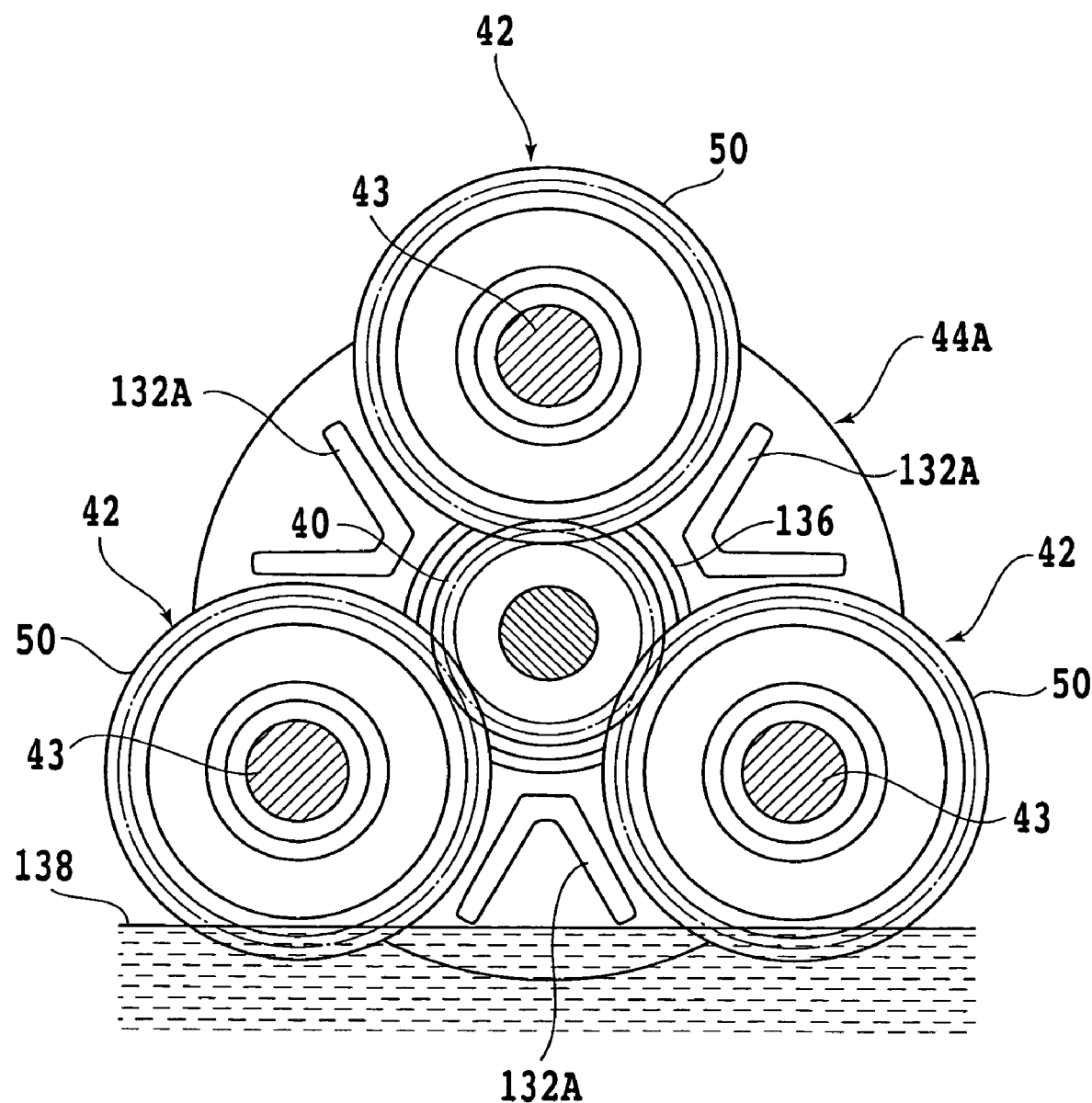
FIG. 8 is a view for showing a planetary carrier according to a second preferred embodiment of the present invention.

FIG. 8 shows a planetary carrier 44A according to a second preferred embodiment of the present invention. In this preferred embodiment, the planetary carrier 44A has a plurality of V-shaped connecting portions 132A for connecting a pair of first and second annular members 128 and 130, wherein each V-shaped connecting portion 132A is separate from the boss 136 and is joined to only the annular members 128 and 130. The second preferred embodiment can exhibit effects similar to those of the first preferred embodiment shown in FIG. 7.

According to the first preferred embodiment shown in FIG. 7, each V-shaped connecting portion 132 opens outward in the radial direction of the annular members 128 and 130. Accordingly, the oil splashed up by the first gears 50 of the dual-stage pinion gears 42 during rotation of the planetary carrier 44 naturally drops into the oil reservoir 126, so that the oil does not stay in the planetary carrier 44. Accordingly, excess lowering of the dynamic oil level 138 in the oil reservoir 126 can be prevented to thereby prevent the occurrence of aeration.

The operation of the power transmitting device 12 according to the present invention will now be described. In the case of driving the axles 20A and 20B for the rear wheels Wr by using the power transmitting device 12, the oil pressure from the motor-driven oil pump 94 is supplied to the hydraulic clutch 54 to thereby engage the clutch 54, i.e., to frictionally engage the fixed plates 70 and the rotating plates 72, thereby fixing the ring gear 46 with respect to the housing 22. When the ring gear 46 is fixed, the speed reduction ratio of the speed reducing mechanism 24 is fixed, and the driving force of the motor 14 is transmitted losslessly between the sun gear 40 and the planetary carrier 44. Accordingly, the driving force of the motor 14 is transmitted through the differential gear unit 26 to the rear axles 20A and 20B with the rotational speed of the motor 14 reduced at the set reduction ratio by the speed reducing mechanism 24.

In the case that the rotational speed of the rear wheels Wr becomes higher than a required driving speed of the motor 14 during downhill running of the vehicle by operating the power transmitting device 12, the oil in the hydraulic clutch 54 is discharged to thereby disengage the clutch 54, thereby canceling the braked condition of the ring gear 46. When the ring gear 46 is thus allowed to freely rotate, the ring gear 46 idly rotates in the housing 22 according to excessive rotation of the axles 20A and 20B. As a result, the rotor 30 of the motor 14 is prevented from being forcibly rotated by the rotation of the axles 20A and 20B. According to the power transmitting device 12, excessive rotation of the rotor 30 of the motor 14 can be prevented without a large increase in volume of the device, and friction on the axles 20A and 20B can be reduced.

In the power transmitting device 12 according to the present invention, each pinion gear (planetary gear) 42 in the planetary gear type speed reducing mechanism 24 is provided by a dual-stage pinion gear having the large-diameter first gear 50 meshing with the sun gear 40 and the second gear 52 smaller in diameter than the first gear 50, so that a large speed reduction ratio can be obtained. Further, the ring gear 46 is provided so as to surround the second gears 52 and to mesh with the second gears 52. Accordingly, the outer diameter of the ring gear 46 can be sufficiently reduced with the diameter of each first gear 50 meshing with the sun gear 40 being kept large.

As a result, the outer diameter of the housing 22 accommodating the ring gear 46 and the hydraulic clutch 54 can be reduced to thereby reduce the outward extension of the power transmitting device 12 in the radial direction. Accordingly, in the vehicle mounting the power transmitting device 12 according to the present invention, the road clearance about the axle 20B can be easily increased. Further, the accumulator 98 for accumulating the oil pressure to be supplied to the hydraulic clutch 54 is annularly provided around the outer circumference of the axle 20B in coaxial relationship with the axle 20B. Accordingly, a sufficient accumulation capacity can be ensured without increasing the amount of radially outward extension of the accumulator.

The present invention is not limited to the above preferred embodiments, but various modifications may be made without departing from the scope of the present invention. For example, the electric motor 14 may be replaced by any driving source. Further, the power transmitting device 12 may be applied to the front wheels Wf rather than the rear wheels Wr. Further, while the multiplate hydraulic clutch 54 is used as a braking mechanism for the ring gear 46 in the above preferred embodiments, a single-plate hydraulic clutch or an electromagnetic clutch may be used as the braking mechanism.

There will now be described a lubricating device for the power transmitting device 12 in relation to the present invention. The lubricating oil from the motor-driven oil pump 94 is supplied through the selector valve 102 to the oil passage 104 by operating the electromagnetic valve 100 shown in FIG. 4. The oil passage 104 is connected to an oil passage 138 formed in the right end wall 22a of the housing 22 as shown in FIG. 2, and the lubricating oil from the oil passage 104 is supplied through the oil passage 138 to an oil passage 140 formed in the axle 20B along the axis thereof.

Figure 11:
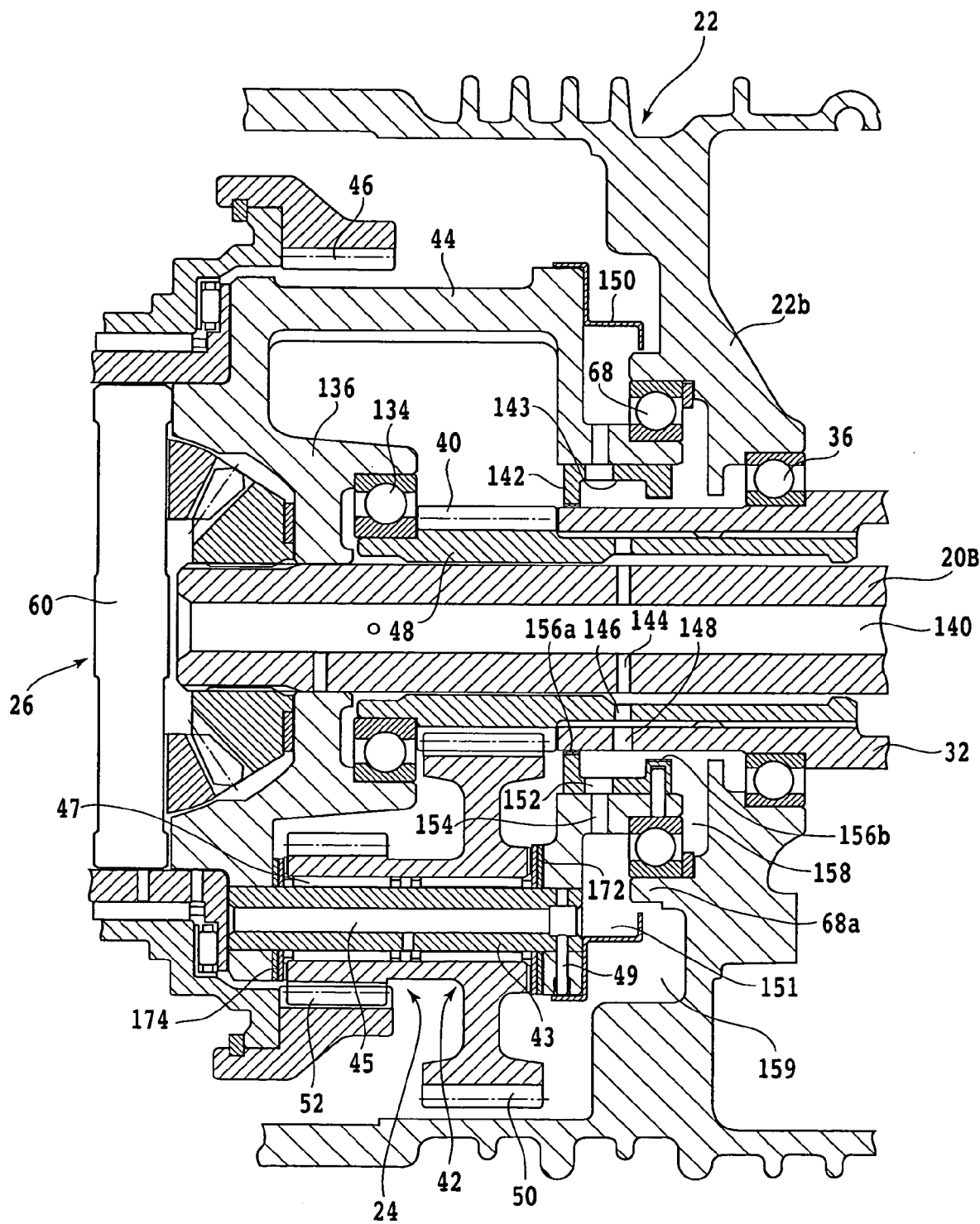
FIG. 11 is a vertical sectional view showing an essential part of a lubricating device in the power transmitting device.

Referring to FIG. 11, the lubricating oil from the oil passage 140 is supplied through radial holes 144 formed in the axle 20B, radial holes 146 formed in the sleeve 48, and radial holes 148 formed in the cylindrical shaft 32 to an annular groove 143 of an annular oil guide 142. The annular oil guide 142 is mounted on the inner circumferential surface of a right end portion of the planetary carrier 44. Further, an annular oil catch plate 150 is mounted on the outer circumferential surface of the right end portion of the planetary carrier 44. Thus, an annular space 151 is defined by the planetary carrier 44, the intermediate wall 22b of the housing 22, and the oil catch plate 150.

The lubricating oil from the annular groove 143 of the annular oil guide 142 is supplied through radial holes 152 formed in the annular oil guide 142 and radial holes 154 formed in the planetary carrier 44 to the annular space 151. The radial holes 144, 146, and 148, the annular groove 143, the radial holes 152 and 154, and the annular space 151 constitute a first oil passage. The annular oil guide 142 has a first clearance 156a on the differential gear unit 26 side and a second clearance 156b on the electric motor 14 side with respect to the outer circumference of the cylindrical shaft 32.

The second clearance 156b is set greater than the first clearance 156a. Accordingly, the lubricating oil in the annular groove 143 leaks through the second clearance 156b to enter an annular space 158 defined by the cylindrical shaft 32, the intermediate wall 22b, and the planetary carrier 44. The lubricating oil in the annular space 158 lubricates the bearing 68 and is then supplied to the annular space 151. Thus, the second clearance 156b, the annular space 158, the bearing 68, and the annular space 151 constitute a second oil passage.

An annular recess 159 is formed on the intermediate wall 22b of the housing 22 at a position adjacent to a bearing supporting portion 68a of the housing 22 for supporting the bearing 68. The oil catch plate 150 is positioned so as to enter the annular recess 159. Accordingly, the lubricating oil flowing from the annular space 158 through the bearing 68 into the annular space 151 can be well caught by the oil catch plate 150 and be guided to one end portion of each pinion shaft 43.

As mentioned above with reference to FIG. 5, the first and second annular members 128 and 130 have the plural through holes 128a and 130a, respectively, and the plural pinion shafts 43 are inserted in these through holes 128a and 130a. Each pinion shaft 43 is fixed to the planetary carrier 44 by a pin 49 as shown in FIG. 11. The annular oil catch plate 150 abuts against one end of the pin 49 to prevent the disengagement of the pin 49.

Referring again to FIG. 11, each dual-stage pinion gear 42 is rotatably supported through a plurality of needle bearings 47 to the corresponding pinion shaft 43. Each pinion shaft 43 has an axial hole 45. One end portion of each pinion shaft 43 is exposed to the annular space 151, so that the lubricating oil supplied through the first oil passage and the second oil passage to the annular space 151 enters the axial hole 45 of each pinion shaft 43. The lubricating oil from the axial hole 45 of each pinion shaft 43 is further supplied through radial holes of each pinion shaft 43 to the outer surface of each pinion shaft 43, the needle bearings 47, and thrust washers 172 and 174 provided on the opposite ends of each dual-stage pinion gear 42, thus lubricating these members 43, 47, 172, and 174.

In the lubricating device mentioned above, the oil passage is composed of the first oil passage for directly supplying the lubricating oil to one end portion of each pinion shaft 43 and the second oil passage for first supplying the lubricating oil leaked from the first oil passage to the bearing 68 for rotatably supporting the planetary carrier 44 and next supplying the lubricating oil to one end portion of each pinion shaft 43. Accordingly, a sufficient amount of lubricating oil can be supplied to each pinion shaft 43, thereby improving the durability of each pinion shaft 43, the needle bearings 47, and the thrust washers 172 and 174.

Figure 12:
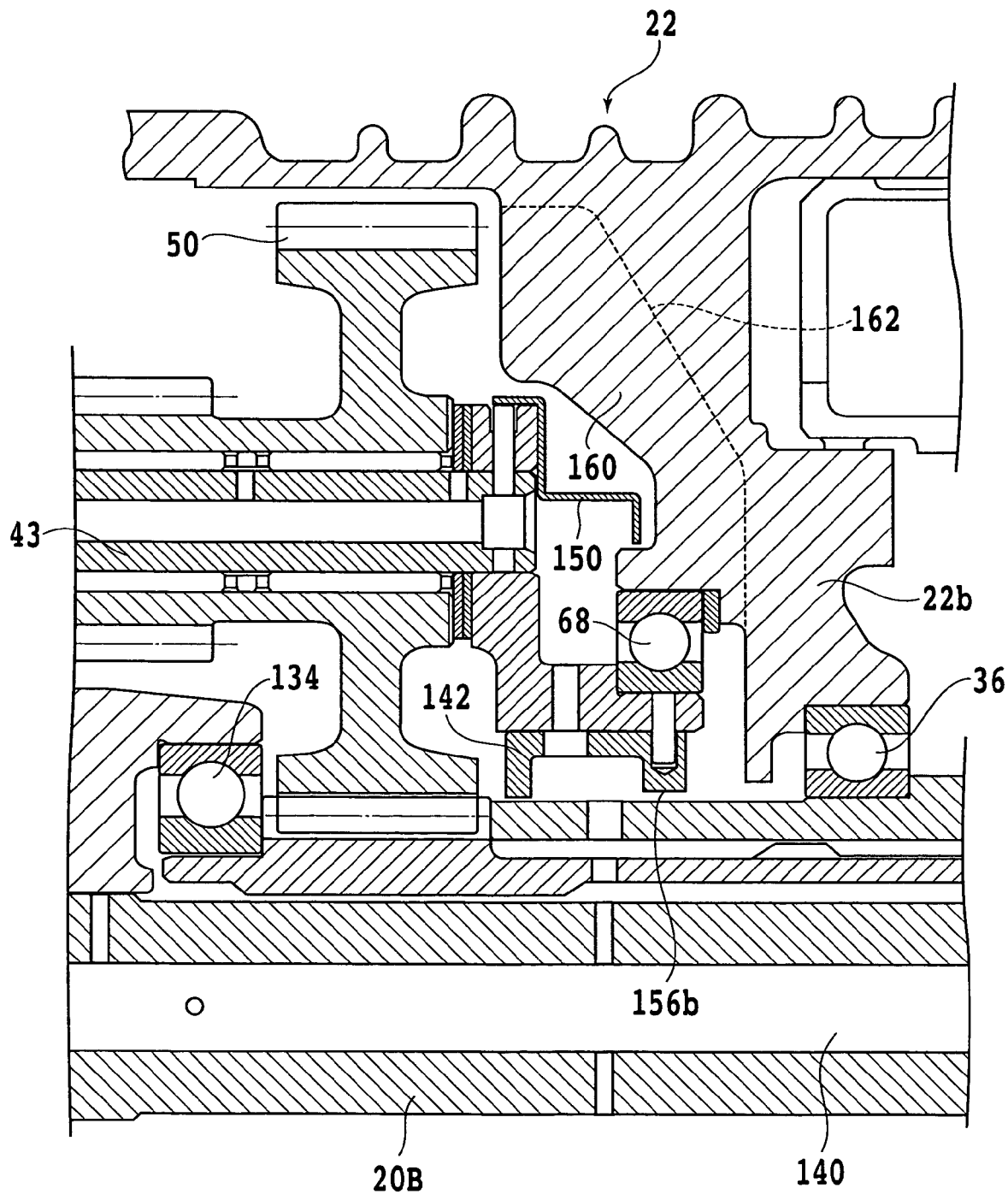
FIG. 12 is a sectional view of an essential part showing a structure for guiding the oil splashed up to a bearing.

There will now be described a configuration for utilizing the oil splashed up by the first gears 50 of the dual-stage pinion gears 42 for the lubrication of the bearing 68 with reference to FIGS. 12 to 14. FIG. 12 is an enlarged sectional view of an essential part of this configuration, FIG. 13 is an end view of the intermediate wall 22b of the housing 22, and FIG. 14 is a perspective view of the intermediate wall 22b shown in FIG. 13.

Figure 13:
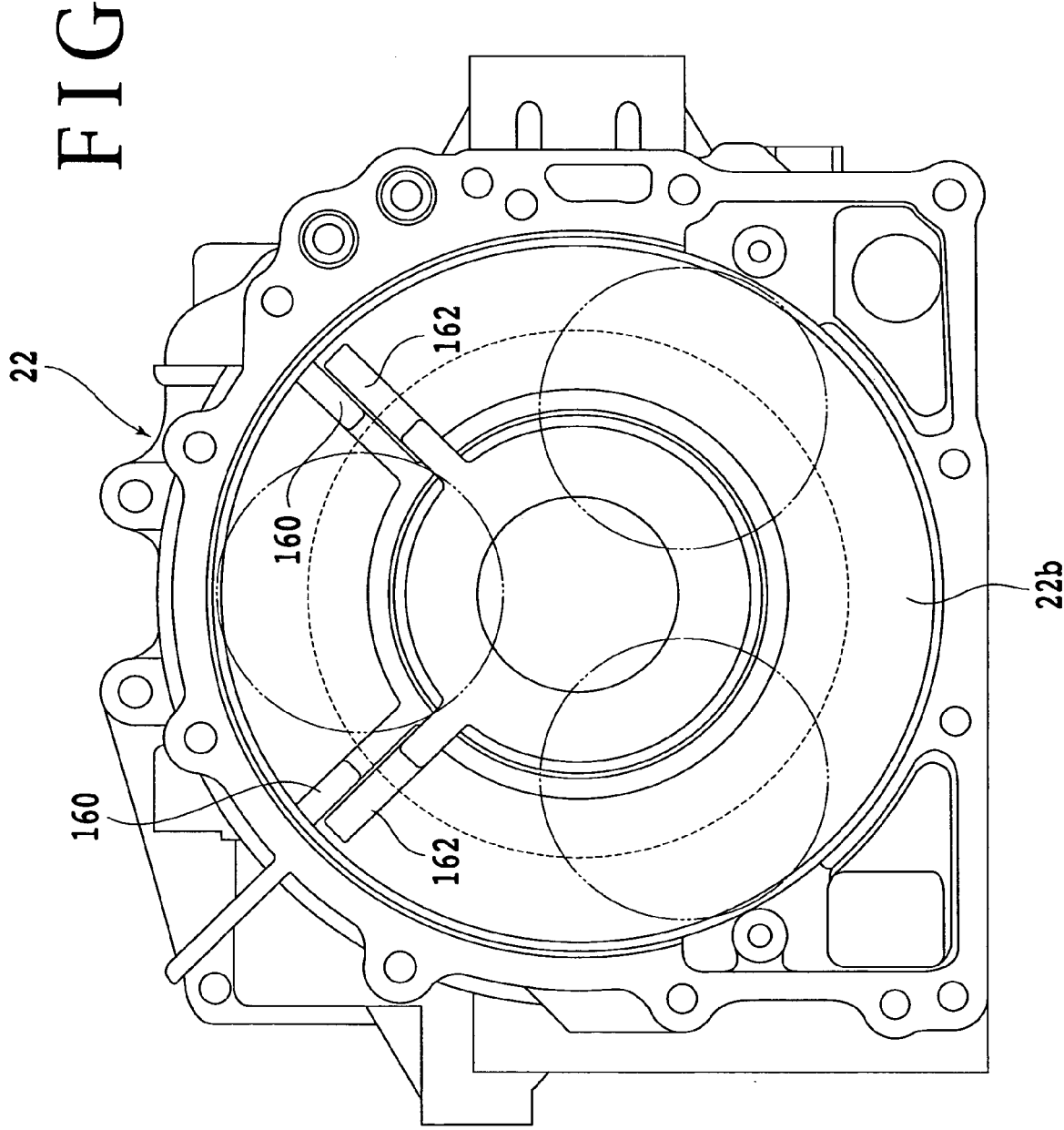
FIG. 13 is an end view of an intermediate wall of a housing.
Figure 14:
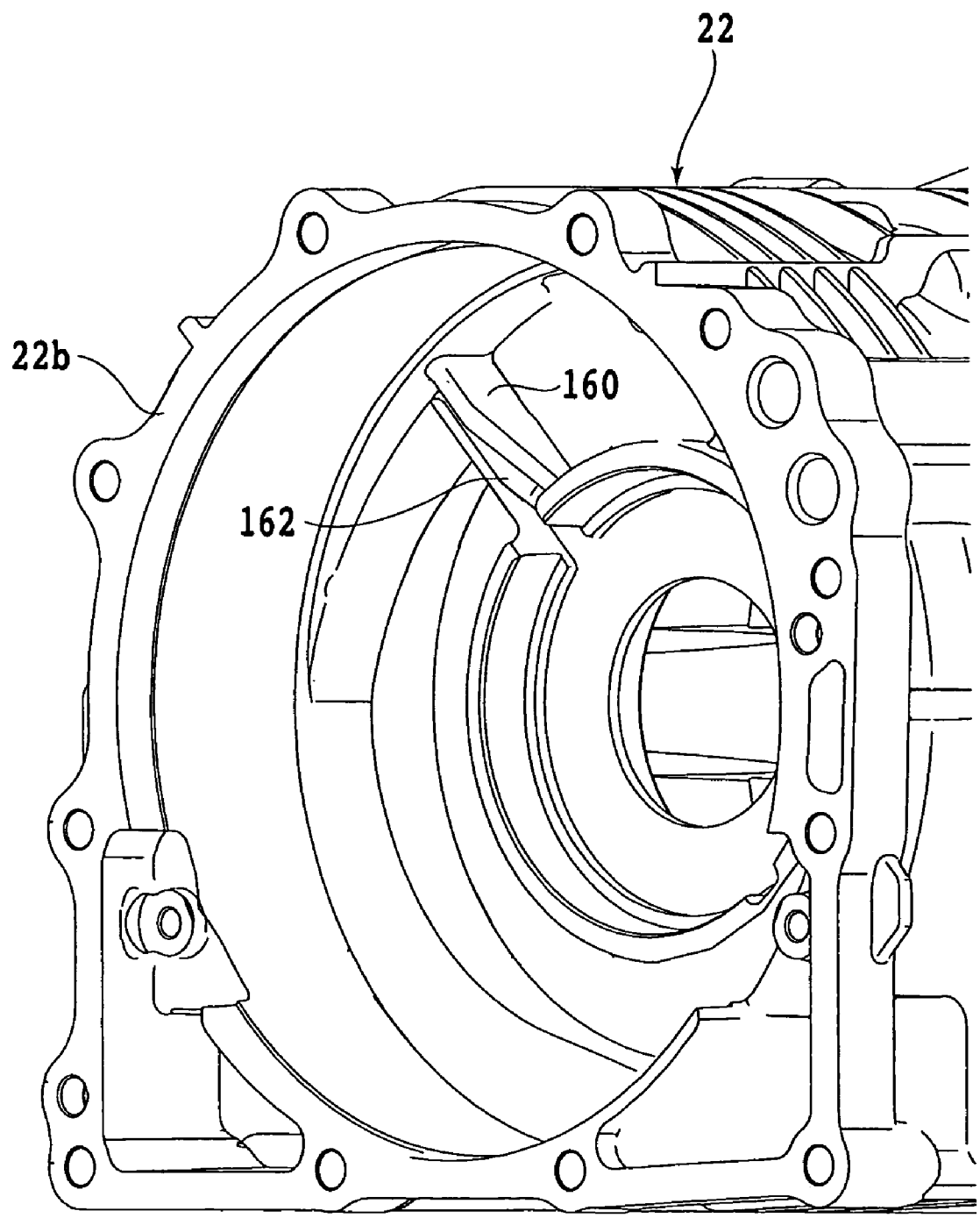
FIG. 14 is a perspective view of the intermediate wall shown in FIG. 13.

As best shown in FIG. 13, a pair of radially extending ribs 160 are formed at an upper portion of the intermediate wall 22b of the housing 22. Each rib 160 is associated with a guide groove 162 for guiding the oil splashed up by the first gears 50 toward the bearing 68. That is, the guide groove 162 is formed on the intermediate wall 22b at a position adjacent to each rib 160. Accordingly, the oil splashed up by the first gears 50 of the dual-stage pinion gears 42 is lifted along the inner circumference of the intermediate wall 22b of the housing 22 during the rotation of the planetary carrier 44. The oil thus lifted collides with the ribs 160 to be diffused and then guided toward the bearing 68 by the respective guide grooves 162. As a result, the bearing 68 can be positively lubricated by the oil splashed up by the first gears 50 of the dual-stage pinion gears 42.

In the above preferred embodiments, the rotational speed of the electric motor 14 is greatly reduced by the planetary gear type speed reducing mechanism 24. That is, the rotational speed of the electric motor 14 is high, causing a problem on gear noise in the speed reducing mechanism 24. To suppress the gear noise, the contact ratio of gear teeth must be increased. In general, a transmission or the like adopts helical gears to increase the contact ratio. However, the use of helical gears in the dual-stage pinion gears 42 causes the generation of gear thrust forces, which may wear the thrust washers 172 and 174 provided at the opposite end portions of each pinion shaft 43.

A structure for solving this problem will now be described with reference to FIGS. 15 to 16B. In this preferred embodiment, the first pinion (gear) 50 and the second pinion (gear) 52 of each dual-stage pinion gear 42 are provided by helical gears as shown in FIG. 16A. The directions of helix of teeth 50a and 52a of the first and second pinions 50 and 52 are set so that a thrust force is directed toward the first pinion 50 in driving, whereas a thrust force is directed toward the second pinion 52 in energy regeneration.

Figure 15:
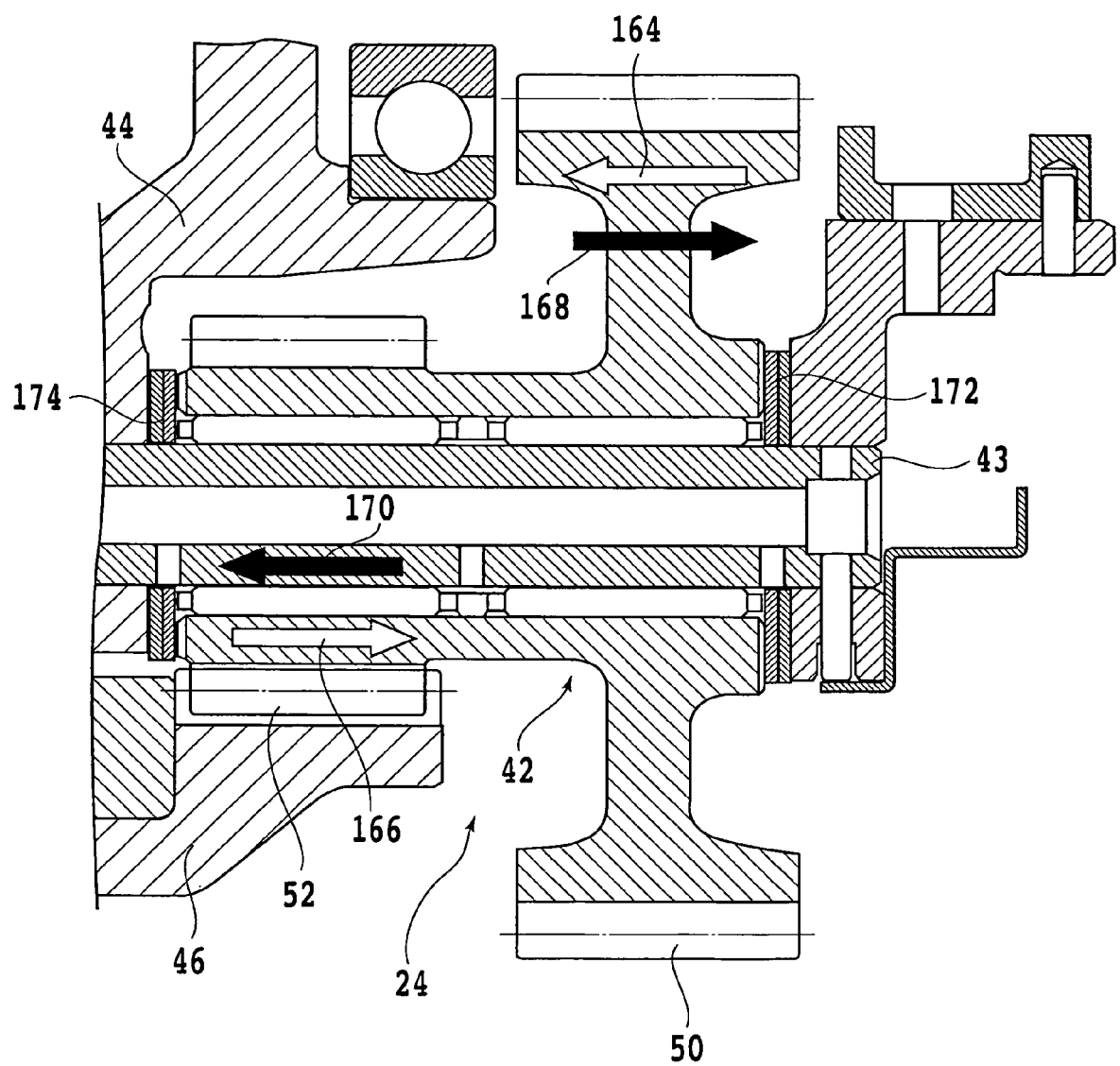
FIG. 15 is a sectional view for illustrating thrust forces in driving and in energy regeration.
Figure 16A:
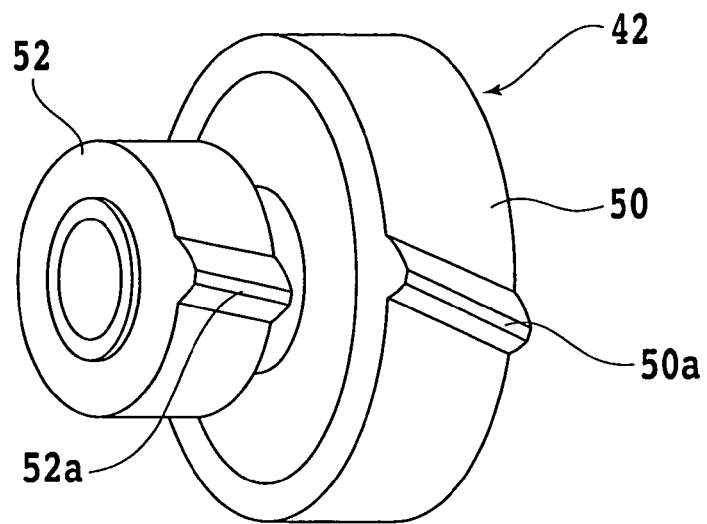
FIG. 16A is a schematic perspective view of the dual-stage pinion gear.
Figure 16B:
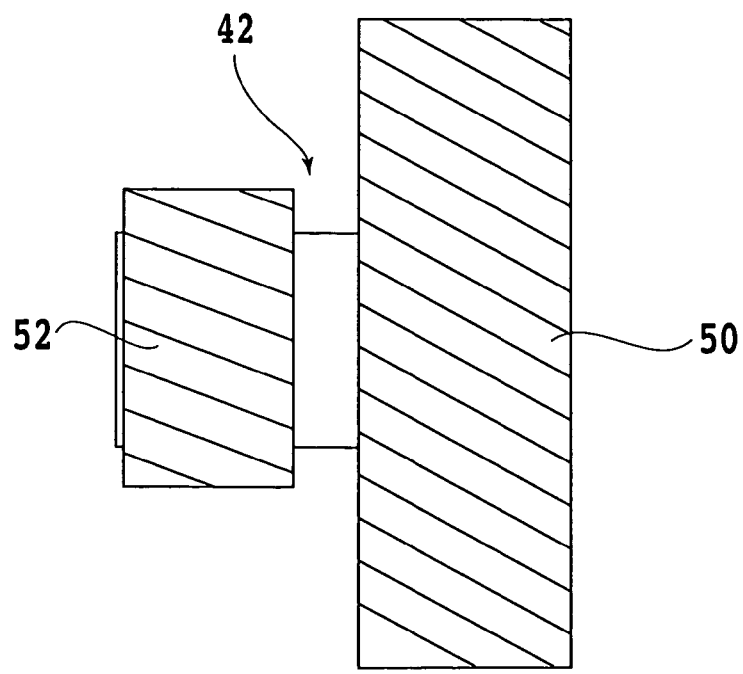
FIG. 16B is an elevational view of the dual-stage pinion gear.

More specifically, an arrow 164 in FIG. 15 shows the direction of a load (thrust force) on the first pinion 50 in driving, and an arrow 166 in FIG. 15 shows the direction of a load (thrust force) on the second pinion 52 in driving. On the other hand, an arrow 168 in FIG. 15 shows the direction of a load (thrust force) on the first pinion 50 in energy regeneration, and an arrow 170 in FIG. 15 shows the direction of a load (thrust force) on the second pinion 52 in energy regeneration. In general, the load in driving is larger than that in energy regeneration.

As mentioned above, the directions of helix of teeth of the first and second pinions 50 and 52 as helical gears are set so that a thrust force is directed toward the first pinion 50 in driving, that is, the thrust force (load) by the second pinion 52 shown by the arrow 166 is larger than the thrust force (load) by the first pinion 50 shown by the arrow 164. Accordingly, the outer diameter of each of the two thrust washers 172 on the first pinion 50 side is set larger than the outer diameter of each of the two thrust washers 174 on the second pinion 52 side, so that the pressure bearing area of each thrust washer 172 is larger than that of each thrust washer 174. As a result, the pressure per unit area on each thrust washer 172 having a larger diameter can be reduced.

In general, the thrust force (load) in driving is larger than that in energy regeneration, and the frequency of applications of the thrust force in driving is higher than that in energy regeneration. Accordingly, by setting the directions of helix of the first and second pinions 50 and 52 as mentioned above, the damage to the thrust washers 172 and 174 can be reduced, and the gear ratio in the speed reducing mechanism 24 can be increased. As shown in FIGS. 16A and 16B, the directions of helix of the first and second pinions 50 and 52 of each dual-stage pinion gear 42 are set to the same direction, but the helix angle of the first pinion 50 is set larger than that of the second pinion 52. For example, the helix angle of the first pinion 50 is set to 36 degrees and the helix angle of the second pinion 52 is set to 20 degrees. Accordingly, the thrust forces applied in opposite directions by the first and second pinions 50 and 52 can be made closer in magnitude, so that the generation of a thrust force in each dual-stage pinion gear 42 as a whole can be suppressed to thereby reduce the damage to the thrust washers 172 and 174.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A power transmitting device for a vehicle for transmitting a driving force from a driving source to right and left axles, comprising:
   a housing;
   a planetary gear type speed reducing mechanism connected to said driving source;
   a differential gear unit arranged in coaxial relationship with said planetary gear type speed reducing mechanism and connected to said right and left axles; and
   an oil reservoir provided in a lower region of said housing;
   said planetary gear type speed reducing mechanism including a sun gear connected to said driving source, a dual-stage pinion gear composed of a first gear meshing with said sun gear and a second gear formed integrally with said first gear in axially adjacent relationship with said first gear, said first gear having a diameter larger than that of said second gear, a planetary carrier for carrying said dual-stage pinion gear, and a ring gear meshing with said second gear of said dual-stage pinion gear;
   said differential gear unit including a differential case formed integrally with said planetary carrier;
   said planetary carrier including first and second annular members axially spaced apart from each other and a plurality of connecting portions for connecting said first and second annular members, each of said connecting portions having a substantially V-shaped configuration opening outward in the radial direction of said first and second annular members.

2. The power transmitting device according to claim 1, wherein the clearance between each V-shaped connecting portion and the outer circumference of said first gear of said dual-stage pinion gear is minimized.

3. The power transmitting device according to claim 1, wherein the radially outermost position of each V-shaped connecting portion is set above a dynamic oil level in said oil reservoir.

4. The power transmitting device according to claim 1, further comprising a braking mechanism provided between said ring gear and said housing for engaging said ring gear and said housing to apply a braking force to said ring gear.

5. The power transmitting device according to claim 1, wherein:
   said driving source includes an electric motor;
   said power transmitting device further comprises a cylindrical shaft connected to a rotor of said electric motor and said sun gear of said planetary gear type speed reducing mechanism; and
   one of said right and left axles is coaxially inserted in said cylindrical shaft.

* * * * *